US008666440B2

(12) United States Patent
Shen et al.

(10) Patent No.: US 8,666,440 B2
(45) Date of Patent: Mar. 4, 2014

(54) SIGNAL TRANSMISSION METHOD AND RELATED DEVICE THEREOF

(75) Inventors: Xiaodong Shen, Beijing (CN); Guangyi Liu, Beijing (CN); Lu Han, Beijing (CN); Dajie Jiang, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 186 days.

(21) Appl. No.: 13/265,711

(22) PCT Filed: Apr. 7, 2010

(86) PCT No.: PCT/CN2010/071598
§ 371 (c)(1),
(2), (4) Date: Jan. 3, 2012

(87) PCT Pub. No.: WO2010/121515
PCT Pub. Date: Oct. 28, 2010

(65) Prior Publication Data
US 2012/0135773 A1  May 31, 2012

(30) Foreign Application Priority Data
Apr. 23, 2009  (CN) .......................... 2009 1 0082643

(51) Int. Cl.
*H04W 72/08* (2009.01)
(52) U.S. Cl.
USPC ........... 455/513; 455/450; 370/318; 370/329; 370/468; 370/476
(58) Field of Classification Search
USPC ...................................................... 455/513
See application file for complete search history.

(56) References Cited

U.S. PATENT DOCUMENTS

| 7,236,474 B2 * | 6/2007 | Seo et al. ........................ 370/329 |
| 7,889,755 B2 * | 2/2011 | Malladi et al. ................. 370/432 |
| 7,986,959 B2 * | 7/2011 | Malladi et al. ................. 455/522 |
| 8,014,265 B2 * | 9/2011 | Sarkar et al. ................... 370/203 |
| 8,077,593 B2 * | 12/2011 | Iwai et al. ....................... 370/204 |
| 8,094,638 B2 * | 1/2012 | Muharemovic et al. ....... 370/342 |

(Continued)

FOREIGN PATENT DOCUMENTS

| CN | 101 203 020 | 6/2008 |
| CN | 101 378 290 | 3/2009 |
| WO | 2008/156293 | 12/2008 |

*Primary Examiner* — Hai V Nguyen
(74) *Attorney, Agent, or Firm* — Fay Kaplun & Marcin, LLP

(57) ABSTRACT

A signal transmission method and related mobile terminal and base station thereof. The method includes: the base station determines a special transmit time interval (TTI) in a downlink carrier (S301); the corresponding time length for which a first type mobile terminal has sent an uplink sounding reference signal to the base station is included in the special TTI; the first type mobile terminal is a mobile terminal which sends the uplink sounding reference signal to the base station in the special TTI; the base station sends a first control signal within a first time length in the special TTI (S302); the first control signal enables a second type mobile terminal to determine that the base station hasn't sent a downlink signal within the remainder time length in the special TTI; the second type mobile terminal is a mobile terminal which does not send the uplink sounding reference signal to the base station in the special TTI. Using the method and the related device enables the future mobile communication system which uses the downlink carrier to introduce the uplink transmission to be compatible with the existing mobile terminals and the future mobile terminals.

20 Claims, 5 Drawing Sheets

(56) References Cited

U.S. PATENT DOCUMENTS

| | | | |
|---|---|---|---|
| 8,155,100 B2* | 4/2012 | Papasakellariou et al. | 370/344 |
| 8,223,723 B2* | 7/2012 | Teo et al. | 370/332 |
| 8,238,297 B2* | 8/2012 | Papasakellariou et al. | 370/329 |
| 8,274,940 B2* | 9/2012 | Ishii et al. | 370/329 |
| 8,295,779 B2* | 10/2012 | Cave et al. | 455/69 |
| 8,331,297 B2* | 12/2012 | Teo et al. | 370/329 |
| 8,363,698 B2* | 1/2013 | Nakao et al. | 375/146 |
| 8,369,382 B2* | 2/2013 | Nakao et al. | 375/146 |
| 8,369,884 B2* | 2/2013 | Ishii et al. | 455/522 |
| 8,374,133 B2* | 2/2013 | Diachina et al. | 370/329 |
| 8,406,182 B2* | 3/2013 | Tiirola et al. | 370/329 |
| 8,428,043 B2* | 4/2013 | Kishiyama et al. | 370/349 |
| 8,483,149 B2* | 7/2013 | Tiirola et al. | 370/329 |
| 8,489,950 B2* | 7/2013 | Huang et al. | 714/748 |
| 8,547,896 B2* | 10/2013 | Park et al. | 370/315 |
| 8,548,006 B2* | 10/2013 | Ko et al. | 370/480 |
| 8,553,635 B2* | 10/2013 | Ahn et al. | 370/329 |
| 8,559,999 B2* | 10/2013 | Hu et al. | 455/522 |
| 2008/0019307 A1* | 1/2008 | Tenny et al. | 370/329 |
| 2009/0010213 A1* | 1/2009 | Yamada et al. | 370/329 |
| 2009/0180435 A1* | 7/2009 | Sarkar | 370/330 |
| 2009/0290549 A1* | 11/2009 | Tiirola et al. | 370/329 |
| 2009/0323957 A1* | 12/2009 | Luo et al. | 380/270 |
| 2010/0037114 A1* | 2/2010 | Huang et al. | 714/749 |
| 2010/0041430 A1* | 2/2010 | Ishii et al. | 455/522 |
| 2010/0091724 A1* | 4/2010 | Ishii et al. | 370/329 |
| 2010/0103902 A1* | 4/2010 | Kim et al. | 370/330 |
| 2010/0103906 A1* | 4/2010 | Montojo et al. | 370/335 |
| 2010/0142467 A1* | 6/2010 | Tiirola et al. | 370/329 |
| 2010/0203895 A1* | 8/2010 | Diachina et al. | 455/450 |
| 2010/0303045 A1* | 12/2010 | Venkob et al. | 370/336 |
| 2010/0322115 A1* | 12/2010 | Wei et al. | 370/280 |
| 2011/0002282 A1* | 1/2011 | Inoue et al. | 370/329 |
| 2011/0194514 A1* | 8/2011 | Lee et al. | 370/329 |
| 2011/0211489 A1* | 9/2011 | Chung et al. | 370/252 |
| 2011/0243087 A1* | 10/2011 | Ahn et al. | 370/329 |
| 2011/0243088 A1* | 10/2011 | Ahn et al. | 370/329 |
| 2012/0163365 A1* | 6/2012 | Papasakellariou et al. | 370/345 |
| 2013/0003659 A1* | 1/2013 | Iwai et al. | 370/328 |
| 2013/0010749 A1* | 1/2013 | Chang et al. | 370/330 |
| 2013/0039272 A1* | 2/2013 | Chen | 370/328 |
| 2013/0072208 A1* | 3/2013 | Marinier et al. | 455/450 |
| 2013/0176995 A1* | 7/2013 | Park et al. | 370/336 |
| 2013/0235829 A1* | 9/2013 | Pani et al. | 370/329 |

\* cited by examiner

SIGNAL TRANSMISSION METHOD AND RELATED DEVICE THEREOF

CROSS REFERENCE TO RELATED APPLICATIONS

The present application is a US National Stage of International Application No. PCT/CN2010/071598, filed 7 Apr. 2010, designating the United States, and claiming priority to Chinese Patent Application No. 200910082643.4 filed 23 Apr. 2009.

FIELD

The present invention relates to the field of mobile communications and particularly to a signal transmission method and related devices such as a mobile terminal and a base station.

BACKGROUND

At present, a $3^{rd}$ Generation Partnership Project (GPP) system generally supports the following duplex modes:

1. Frequency Division Duplex (FDD): a downlink timeslot is transmitted over a downlink carrier and an uplink timeslot is transmitted over an uplink carrier, both of which are paired in an FDD spectrum, and a base station and a mobile terminal can receive and transmit data concurrently;

2. Time Division Duplex (TDD): uplink and downlink timeslots are transmitted in time division over the same TDD carrier; and 3. Half-duplex FDD: a downlink timeslot is transmitted over a downlink carrier and an uplink timeslot is transmitted over an uplink carrier, both of which are paired in an FDD spectrum, and transmission and reception occurs in time division instead of occurring concurrently.

Particularly a frame structure of Long Term Evolution (LTE) FDD is as illustrated in FIG. 1, and a frame structure of LTE TDD is as illustrated in FIG. 2. In FIG. 1 and FIG. 2, a frame has a duration of time of $T_f=207200T_s=10$ ms and includes 10 sub-frames, each of which is equivalent to a Transmission Time Interval (TTI) with the duration of time of 1 ms, and a sub-frame includes two time slots, each of which has a duration of time of $15360T_s$, $=0.5$ ms.

The 3GPP currently supports beam-forming (i.e., supports an operation mode with a single-antenna port) in which a signal is demodulated with a dedicated pilot of the port 5. For beam-forming, a transmitter can properly transmit a signal only if it knows status information of a channel. In an FDD system, uplink and downlink channels can not be interchangeable due to their different carrier frequencies. That is, a base station can not estimate, status information of a corresponding channel of a downlink carrier frequency, from a Sounding Reference Signal (SRS) transmitted at an uplink carrier frequency from a mobile terminal; and alike, the mobile terminal can not estimate, status information of a corresponding channel of the uplink carrier frequency, from an SRS transmitted at the downlink carrier frequency from the base station. Regardless of whether the mobile terminal or the base station, the ability to acquire current channel statuses of the respective channels relatively accurately is indispensable to controlling of signal transmission and reception.

Therefore a mobile communication system, in which the technical features of the existing FDD system and TDD system at present are integrated, and a corresponding future mobile terminal with an additional function as compared with the existing mobile terminal, will emerge in the future. When the existing mobile terminal and the future mobile terminal are used concurrently in the future mobile communication system, the existing mobile terminal may not operate normally, that is, such a problem may arise that the existing mobile terminal and the future mobile terminal can not be compatible in the future mobile communication system.

SUMMARY

Embodiments of the invention provide a signal transmission method and related devices so that an existing mobile terminal and a future mobile terminal can be compatible in a future mobile communication system with uplink transmission introduced over a downlink carrier.

An embodiment of the invention provides a signal transmission method including:

determining by a base station a special Transmission Time Interval, TTI, over a downlink carrier, wherein the special TTI includes a corresponding duration of time in which a first type of mobile terminal transmits an uplink Sound Reference Signal to the base station, and the first type of mobile terminal is a mobile terminal transmitting the uplink Sound Reference Signal to the base station in the special TTI; and transmitting by the base station a first control signal in a first duration of time in the special TTI to make a second type of mobile terminal judge that the base station transmits no downlink signal in the remaining duration of time in the special TTI, wherein the second type of mobile terminal is a mobile terminal transmitting no uplink Sound Reference Signal to the base station in the special TTI.

An embodiment of the invention further provides a base station including:

a determination unit configured to determine a special Transmission Time Interval, TTI, over a downlink carrier, wherein the special TTI includes a corresponding duration of time in which a first type of mobile terminal transmits an uplink Sound Reference Signal to the base station, and the first type of mobile terminal is a mobile terminal transmitting the uplink Sound Reference Signal to the base station in the special TTI; and a signal transmission unit configured to transmit a first control signal in a first duration of time in the special TTI to make a second type of mobile terminal judge that the base station transmits no downlink signal in the remaining duration of time in the special TTI, wherein the second type of mobile terminal is a mobile terminal transmitting no uplink Sound Reference Signal to the base station in the special TTI.

An embodiment of the invention further provides a mobile terminal including a determination unit and a signal transmission unit, wherein:

the determination unit is configured to determine a special Transmission Time Interval, TTI, over a downlink carrier, wherein the special TTI includes a corresponding duration of time in which the signal transmission unit transmits an uplink Sound Reference Signal to a base station, and to ignore a first control signal transmitted from the base station in a first duration of time in the special TTI, wherein the first control signal makes a second type of mobile terminal judge that the base station transmits no downlink signal in the remaining duration of time in the special TTI, and the second type of mobile terminal is a mobile terminal transmitting no uplink Sounding Reference Signal to the base station in the special TTI; and the signal transmission unit is configured to transmit the uplink Sounding Reference Signal to the base station in a second duration of time in the special TTI.

An embodiment of the invention further provides a mobile communication system including a base station, a first type of mobile terminal and a second type of mobile terminal, wherein:

the base station is configured to determine a special Transmission Time Interval, TTI, over a downlink carrier, wherein the special TTI includes a corresponding duration of time in which the first type of mobile terminal transmits an uplink Sound Reference Signal to the base station, to transmit a first control signal in a first duration of time in the special TTI, and to receive the uplink Sound Reference Signal transmitted from the first type of mobile terminal in a second duration of time in the special TTI;

the first type of mobile terminal is configured to determine the special TTI, to ignore the first control signal, and to transmit the uplink Sound Reference Signal in the second duration of time in the special TTI; and the second type of mobile terminal is configured to judge from the first control signal that the base station transmits no downlink signal in the remaining duration of time in the special TTI.

In the embodiments of the invention, the base station transmits a first control signal in a first duration of time in a special TTI over a downlink carrier, and the special TTI includes a corresponding duration of time in which a first type of mobile terminal transmitting an uplink Sounding Reference Signal to the base station in the special TTI transmits the uplink Sounding Reference Signal to the base station; and correspondingly the first type of mobile terminal ignores the first control signal and transmits the uplink Sounding Reference Signal in a second duration of time in the special TTI, and a second type of mobile terminal transmitting no uplink Sounding Reference Signal to the base station in the special TTI judges from the received first control signal that the base station transmits no downlink signal in the remaining duration of time in the special TTI. The foregoing first type of mobile terminal represents a future mobile terminal, and the second type of mobile terminal represents an existing mobile terminal, and when the future mobile terminal transmits the uplink Sounding Reference Signal to the base station in the corresponding duration of time in the special TTI, the existing mobile terminal has judged from the first control signal that the base station transmits no downlink signal in the remaining duration of time in the special TTI and may further determine no downlink signal to be received in the remaining duration of time in the special TTI, thus the existing mobile terminal determines how to operate (i.e., not receive any downlink signal) when the future mobile terminal transmits the uplink Sounding Reference Signal to the base station in the corresponding duration of time in the special TTI, thereby avoiding the existing mobile terminal from failing to operate normally because it transmits no uplink Sounding Reference Signal in the corresponding duration of time and fails to perform a corresponding operation in response to the control signal transmitted from the base station, that is, achieving compatibility between the existing mobile terminal and the future mobile terminal in a future mobile communication system with uplink transmission introduced over the downlink carrier.

DETAILED DESCRIPTION

Figure 1:
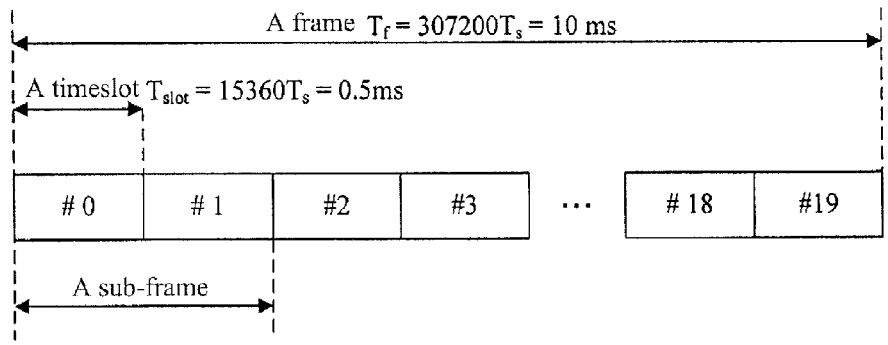
FIG. 1 is a schematic diagram of a frame structure of LTE FDD.
Figure 2:
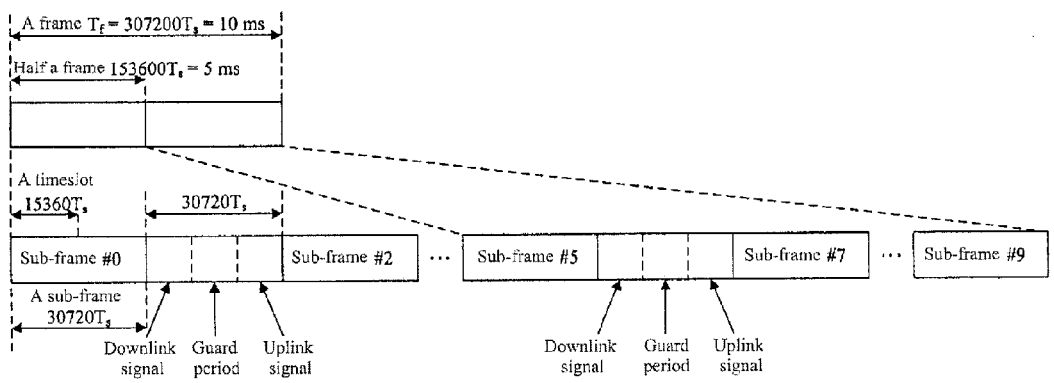
FIG. 2 is a schematic diagram of a frame structure of LTE TDD.

In an implementation of a future mobile communication system, transmission of a downlink SRS is introduced over an uplink carrier and transmission of an uplink SRS is introduced over a downlink carrier, and correspondingly a future mobile terminal estimates, status information of a channel of the uplink carrier, from the received downlink SRS and transmits an uplink signal to a base station over the uplink carrier according to the estimated status information of the channel of the uplink carrier; and the base station estimates, status information of a channel of the downlink carrier, from the received uplink SRS and transmits a downlink signal to the mobile terminal over the downlink carrier according to the estimated status information of the channel of the downlink carrier.

Specifically, for example, the foregoing solution with transmission of an uplink SRS introduced over a downlink carrier is applied to an FDD downlink carrier and the foregoing solution with transmission of a downlink SRS introduced over an uplink carrier is applied to an FDD uplink carrier so that the future mobile terminal and the base station operate over the FDD carriers in a TDD operation mode.

In another example, the FDD uplink and downlink carriers are configured respectively over two TDD carriers spaced at a specific interval, that is, a TDD carrier is determined as an uplink carrier and another TDD carrier spaced at a specific interval from the TDD carrier is determined as a downlink carrier, and the foregoing solution is applied to the uplink carrier (the TDD carrier) and the downlink carrier (the other TDD carrier) so that the future mobile terminal and the base station operate over the TDD carriers in an FDD operation mode.

As can be apparent, the foregoing future mobile communication system overlooks the difference between the existing FDD system and TDD system in their implementations and is a mobile communication system with both advantages of the existing FDD system and TDD system.

However in an existing mobile communication system, for reception of a downlink signal at an existing mobile terminal, a base station has to transmit a downlink signal consecutively over a downlink carrier and to transmit a control signal initially in each TTI, and the existing mobile terminal performs a corresponding operation in the TTI according to the control signal. When the existing mobile terminal and the future mobile terminal coexist in the future mobile communication system, uplink transmission is introduced over the downlink carrier, therefore when the future mobile terminal performs uplink transmission in a special TTI, the existing mobile terminal performs no uplink transmission in the special TTI and fails to perform the corresponding operation according to the control signal transmitted from the base station and consequently can not operate normally, thus resulting in incompatibility between the existing mobile terminal and the future mobile terminal in the future mobile communication system.

Figure 3:
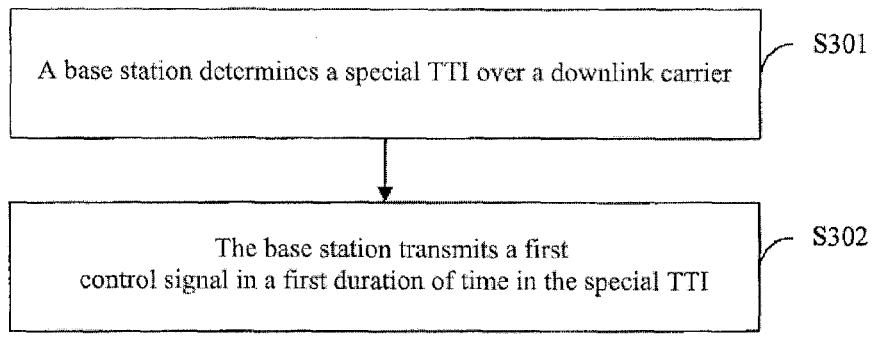
FIG. 3 is a flow chart of a signal transmission method according to an embodiment of the invention.

In order to address the foregoing problem, an embodiment of the invention provides a signal transmission method which, as illustrated in FIG. 3, includes the following operations S301 to S302.

In the operation S301, a base station determines a special TTI over a downlink carrier.

The special TTI includes a corresponding duration of time in which a first type of mobile terminal transmits an uplink Sound Reference Signal (SRS) to the base station, where the first type of mobile terminal is a mobile terminal transmitting the uplink SRS to the base station in the special TTI.

In the operation S302, the base station transmits a first control signal in a first duration of time in the special ITT.

The first control signal makes a second type of mobile terminal judge that the base station transmits no downlink signal in the remaining duration of time in the special TTI, where the second type of mobile terminal is a mobile terminal transmitting no uplink SRS to the base station in the special TTI.

The first type of mobile terminal represents the future mobile terminal, and the second type of mobile terminal represents the existing mobile terminal, and for the sakes of a convenient description and of facilitating understanding of the embodiments of the invention, the foregoing method according to the invention will be described below in details in connection with the "future mobile terminal" and the "existing mobile terminal" with reference to the drawings.

Figure 4:
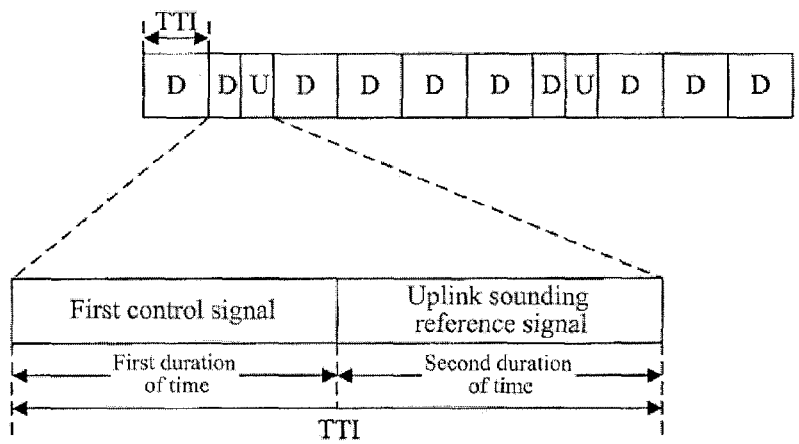
FIG. 4 is a first schematic diagram of the status of signal transmission in each TTI over a downlink carrier according to an embodiment of the invention.

As illustrated in FIG. 4 which is a schematic diagram of the status of signal transmission in each TTI over a downlink carrier according to an embodiment of the invention, where "D" represents transmission of a downlink signal and "U" represents transmission of an uplink signal. In the present embodiment, a TTI with a corresponding duration of time in which a future mobile terminal transmits an uplink Sounding Reference Signal (SRS) is referred to as a special TTI and a TTI in which only a downlink signal is transmitted is referred to as a normal TTI. A base station determines a special TTI over a downlink carrier according to a preset strategy, and for example, two special TTIs are spaced by four normal TTIs in a preferred instance of the preset strategy.

The base station transmits a first control signal in a first duration of time in a special TTI. An existing mobile terminal receives and parses the first control signal and then judges that the base station transmits no downlink signal in the remaining duration of time in the special TTI, and therefore the existing mobile terminal will not attempt to receive any downlink signal in the remaining duration of time in the special TTI according to the first control signal.

The future mobile terminal ignores the first control signal transmitted from the base station in the first duration of time in the special TTI. This may be done particularly by not receiving the first control signal or by receiving but not parsing or directly discarding the first control signal or by receiving and parsing the first control signal but not judging from the first control signal that the base station transmits no downlink signal in the remaining duration of time in the special TTI. Therefore the future mobile terminal will not judge from the first control signal that the base station transmits no downlink signal in the remaining duration of time in the special TTI.

The future mobile terminal transmits an uplink SRS to the base station in a second duration of time in the special TTI. The base station estimates, status information of a channel of the downlink carrier, from the received uplink SRS and transmits a downlink signal in a normal TTI according to the status information of the channel.

As can be apparent from the foregoing description, the first control signal transmitted from the base station in an embodiment of the invention in the first duration of time in a special TTI is received and parsed by the existing mobile terminal, which in turn judges that the base station transmits no downlink signal in the remaining duration of time in the special TTI. In the Multicast Broadcast Single Frequency Network (MBSFN) solution of the LTE Release 8 (Rel8), an MBSFN control signal transmitted from the base station is also received and parsed by the mobile terminal, which in turn judges that the base station transmits no downlink signal in the remaining duration of time in the TTI, and therefore such an MBSFN control signal may be used as the first control signal in the embodiment of the invention without any modification to the existing mobile terminal.

Figure 5A:
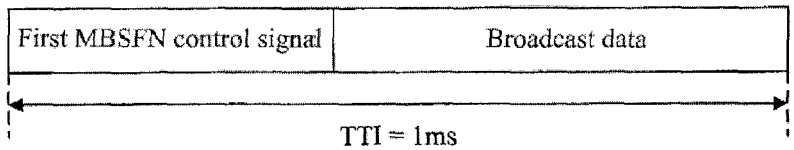
FIG. 5A and FIG. 5B are schematic diagrams of the structure of an MBSFN sub-frame in the LTE Rel8.
Figure 5B:
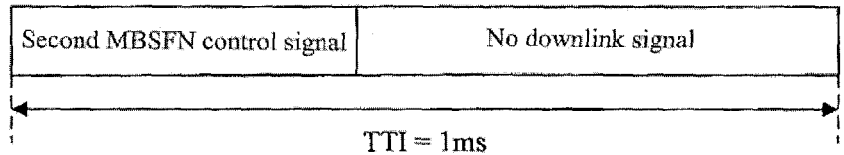

The MBSFN solution in the LIE Rel8 is as illustrated in FIG. 5A and FIG. 5B, where the base station transmits broadcast data to the mobile terminal in a TTI of a corresponding MBSFN sub-frame. Specifically, a first MBSNF control signal or a second MBSFN control signal is transmitted to the mobile terminal in a segment of duration of time in the TTI, and broadcast data is transmitted or no downlink signal is transmitted to the mobile terminal in the remaining duration of time in the TTI; and the mobile terminal receives the first MBSNF control signal or the second MBSNF control signal transmitted from the base station in the preceding segment of duration of time in the TTI and judges from the first MBSFN control signal that the base station transmits broadcast data in the remaining duration of time in the TTI and correspondingly receives the broadcast data transmitted from the base station in the remaining duration of time in the TTI, and the mobile terminal judges from the second MBSFN control signal that the base station transmits no downlink signal in the remaining duration of time in the TTI and correspondingly will not attempt to receive any downlink signal in the remaining duration of time in the TTI.

With the foregoing second MBSFN control signal being the first control signal in the embodiment of the invention, the existing mobile terminal will be neither modified in hardware nor functionally enhanced. For the future mobile terminal, it is still necessary to make the future mobile terminal judge that the base station transmits no downlink signal in the remaining duration of time in the normal TTI, thus the future mobile terminal shall process the second MBSFN control signal in the special TTI differently from in a normal TTI, for example, by, in the special TTI, not receiving the second MBSFN control signal or receiving but not parsing the second MBSFN control signal or receiving and parsing second MBSFN control signal and not judging from the second MBSFN control signal that the base station transmits no downlink signal in the remaining duration of time in the special TTI.

Of course a new control signal may alternatively be used as the first control signal in the embodiment of the invention to implement the method according to the invention so long as it is functionally equivalent to the foregoing first control signal, and at this time the existing mobile terminal shall be provided with a function of identifying the first control signal.

Figure 6:
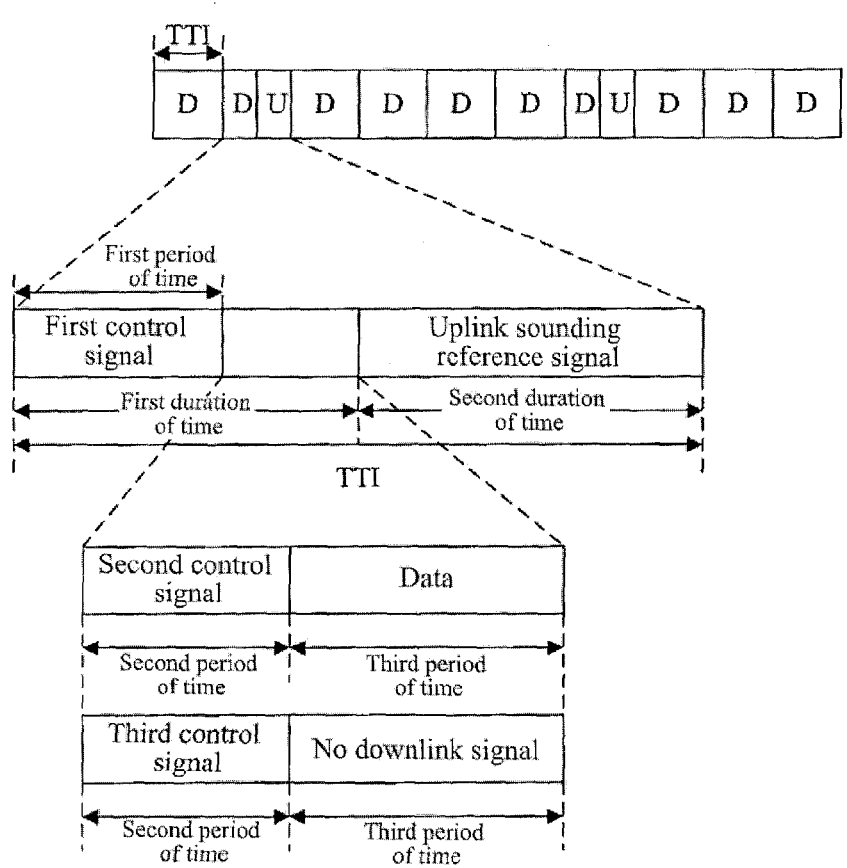
FIG. 6 is a second schematic diagram of the status of signal transmission in each TTI over a downlink carrier according to an embodiment of the invention.

Preferably the base station may further transmit data to the future mobile terminal in the first duration of time in an embodiment of the invention in order to improve the ratio of utilizing the resource of timeslots in a special TTI, particularly as illustrated in FIG. 6.

Unlike the structure of timeslots in a special TTI illustrated in FIG. 4, the base station transmits a first control signal in a first period of time in a first duration of time in a special TTI, transmits a second control signal in a second period of time in the first duration of time and transmits data to the future mobile terminal in a third period of time in the first duration of time. Correspondingly the future mobile terminal receives the second control signal transmitted from the base station in the second period of time and receives the data transmitted from the base station in the third period of time according to the second control signal. Specifically, for example, the future mobile terminal may receive data corresponding thereto among the data transmitted from the base station according to the second control signal without receiving the remaining data; and in another example, the future mobile terminal can judge from the second control signal that the base station transmits data in the third period of time.

In an embodiment of the invention, the base station may further transmit a first control in a first period of time in a first duration of time in a special TTI and a third control signal in a second period of time in the first duration of time. Correspondingly the future mobile terminal receives the third control signal transmitted from the base station in the second period of time and judges from the third control signal that the base station transmits no downlink signal in the third period of time in the first duration of time.

Figure 7:
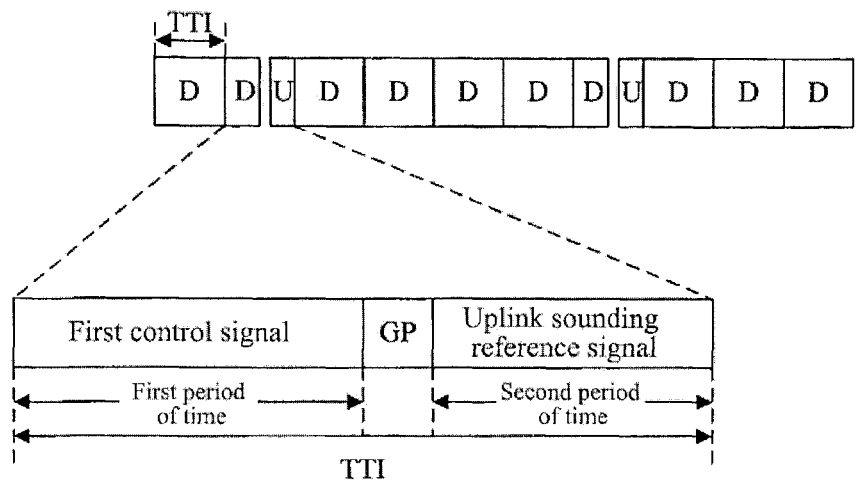
FIG. 7 is a third schematic diagram of the status of signal transmission in each TTI over a downlink carrier according to an embodiment of the invention.

Preferably a Guard Period (GP) duration of time may be reserved between the first duration of time and the second duration of time in the special TTI in the embodiment of the invention in order to reduce interference between uplink and downlink signals, and the structure of timeslots in the special TTI is particularly as illustrated in FIG. 7.

Figure 8:
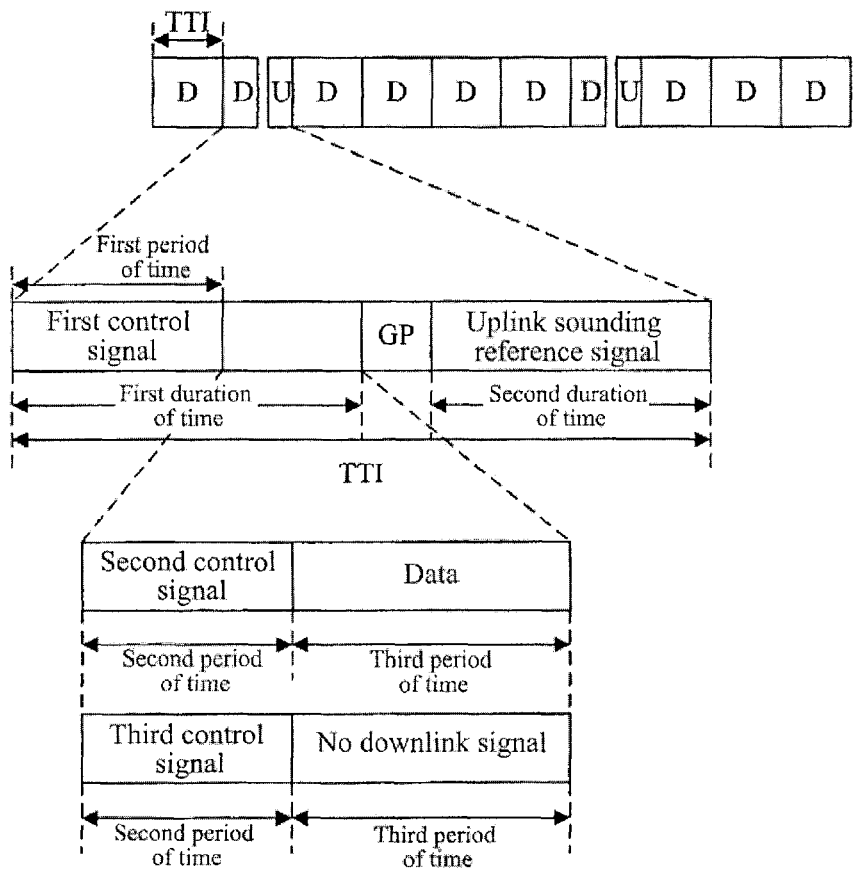
FIG. 8 is a fourth schematic diagram of the status of signal transmission in each TTI over a downlink carrier according to an embodiment of the invention.

In the embodiment of the invention, a GP duration of time may also be reserved between the first duration of time and the second duration of time in the special TTI illustrated in FIG. 6 in order to reduce interference between uplink and downlink signals, and the structure of timeslots thereof is as illustrated in FIG. 8.

In the foregoing signal transmission method according to the embodiments of the invention, the first duration of time and the second duration of time in the special TTI, the first period of time, the second period of time and the third period of time in the first duration of time, and the GP duration of time between the first duration of time and the second duration of time may be configured flexibly with specific lengths of timeslots.

Figure 9:
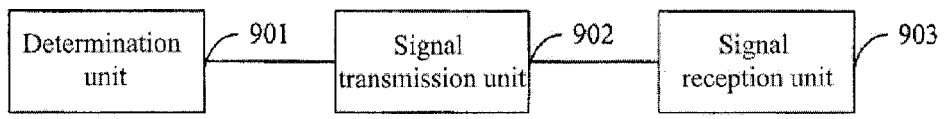
FIG. 9 is a schematic diagram of the structure of a base station according to an embodiment of the invention.

Based upon the same inventive idea and in correspondence to the signal transmission method according to the foregoing embodiments of the invention, another embodiment of the invention further provides a base station, and a schematic diagram of the structure thereof is as illustrated in FIG. 9, which includes:

a determination unit 901 configured to determine a special TTI over a downlink carrier, where the special TTI includes a corresponding duration of time in which a first type of mobile terminal transmits an uplink Sound Reference Signal to the base station, and the first type of mobile terminal is a mobile terminal transmitting the uplink Sound Reference Signal to the base station in the special TTI; and a signal transmission unit 902 configured to transmit a first control signal in a first duration of time in the special TTI to make a second type of mobile terminal judge that the base station transmits no downlink signal in the remaining duration of time in the special TTI, where the second type of mobile terminal is a mobile terminal transmitting no uplink Sound Reference Signal to the base station in the special TTI.

Preferably the signal transmission unit 902 is configured to transmit the first control signal in a first period of time in the first duration of time, to transmit a second control signal in a second period of time in the first duration of time, where the second control signal is used for instructing the first type of mobile terminal to receive data, and to transmit data in a third period of time in the first duration of time.

Preferably the signal transmission unit 902 is configured to transmit the first control signal in a first period of time in the first duration of time, and to transmit a third control signal in a second period of time in the first duration of time, where the third control signal is used for making the first type of mobile terminal to judge that the base station transmits no downlink signal in a third period of time in the first duration of time.

Preferably the base station further includes:

a signal reception unit 903 configured to receive the uplink Sounding Reference Signal transmitted from the first type of mobile terminal in a second duration of time in the special TTI.

Figure 10:
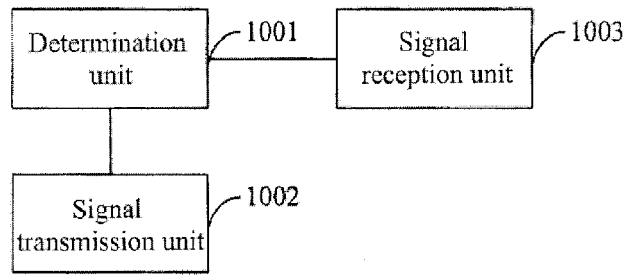
FIG. 10 is a schematic diagram of the structure of a mobile terminal according to an embodiment of the invention.

Based upon the same inventive idea and in correspondence to the signal transmission method according to the foregoing embodiments of the invention, another embodiment of the invention further provides a mobile terminal, which may also be referred to as a future mobile terminal, and a schematic diagram of the structure thereof is as illustrated in FIG. 10, which includes a determination unit 1001 and a signal transmission unit 1002, where:

the determination unit 1001 is configured to determine a special TTI over a downlink carrier, where the special TTI includes a corresponding duration of time in which the signal transmission unit 1002 transmits an uplink Sound Reference Signal to a base station, and to ignore a first control signal transmitted from the base station in a first duration of time in the special TTI, where the first control signal makes a second type of mobile terminal judge that the base station transmits no downlink signal in the remaining duration of time in the special TTI, and the second type of mobile terminal is a mobile terminal transmitting no uplink Sounding Reference Signal to the base station in the special TTI; and the signal transmission unit 1002 is configured to transmit the uplink Sounding Reference Signal to the base station in a second duration of time in the special TTI.

Preferably the determination unit is configured to ignore the first control signal transmitted from the base station in a first period of time in the first duration of time.

The mobile terminal further includes:

a signal reception unit 1003 configured to receive a second control signal transmitted from the base station in a second period of time in the first duration of time, and to receive data transmitted from the base station in a third period of time in the first duration of time according to the second control signal.

Preferably the determination unit is configured to ignore the first control signal transmitted from the base station in a first period of time in the first duration of time.

The mobile terminal further includes:

a signal reception unit 1003 configured to receive a third control signal transmitted from the base station in a second period of time in the first duration of time, and to judge from the third control signal that the base station transmits no downlink signal in a third period of time in the first duration of time.

Figure 11:
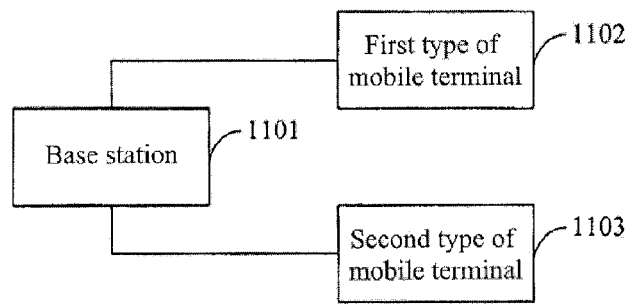
FIG. 11 is a schematic diagram of the structure of a mobile communication system according to an embodiment of the invention.

Based upon the same inventive idea and in correspondence to the signal transmission method according to the foregoing embodiments of the invention, another embodiment of the invention further provides a mobile communication system, and a schematic diagram of the structure thereof is as illustrated in FIG. 11, which includes a base station 1101, a first type of mobile terminal 1102 and a second type of mobile terminal 1103, where:

the base station 1101 is configured to determine a special TTI over a downlink carrier, where the special TTI includes a corresponding duration of time in which the first type of mobile terminal 1102 transmits an uplink Sound Reference Signal to the base station, to transmit a first control signal in a first duration of time in the special TTI, and to receive the uplink Sound Reference Signal transmitted from the first type of mobile terminal 1102 in a second duration of time in the special TTI;

the first type of mobile terminal 1102 is configured to determine the special TTI, to ignore the first control signal, and to transmit the uplink Sound Reference Signal in the second duration of time in the special TTI; and the second type of mobile terminal 1103 is configured to judge from the first control signal that the base station 1101 transmits no downlink signal in the remaining duration of time in the special TTI.

Preferably the base station 1101 is configured to transmit the first control signal in a first period of time in the first duration of time, to transmit a second control signal in a second period of time in the first duration of time, and to transmit data in a third period of time in the first duration of time.

The first type of mobile terminal 1102 is configured to receive the second control signal, and to receive the data transmitted from the base station 1101 according to the second control signal.

Preferably the base station 1101 is configured to transmit the first control signal in a first period of time in the first duration of time, and to transmit a third control signal in a second period of time in the first duration of time.

The first type of mobile terminal 1102 is configured to receive the third control signal, and to judge from the third control signal that the base station 1101 transmits no downlink signal in a third period of time in the first duration of time.

In summary, with the solution according to the embodiments of the invention, the base station determines a special TTI over a downlink carrier, where the special TTI includes a corresponding duration of time in which a first type of mobile terminal transmitting an uplink Sounding Reference Signal to the base station in the special TTI transmits the uplink Sounding Reference Signal to the base station; and the base station transmits a first control signal in a first duration of time in the special TTI, where the first control signal makes a second type of mobile terminal, which transmits no Sounding Reference Signal to the base station in the special TTI, judge that the base station transmits no downlink signal in the remaining duration of time in the special TTI. With the solution according to the embodiments of the invention, an existing mobile terminal can operate normally in a future mobile communication system with uplink transmission introduced over a downlink carrier, thereby achieving compatibility between the existing mobile terminal and a future mobile terminal in the future mobile communication system.

Evidently those skilled in the art can make various modifications and variations to the invention without departing from the scope of the invention. Thus the invention is also intended to encompass these modifications and variations thereto provided the modifications and variations come into the scope of the claims appended to the invention and their equivalents.

The invention claimed is:

1. A signal transmission method, comprising:
   determining, by a base station, a special Transmission Time Interval, TTI, over a downlink carrier, wherein the special TTI comprises a corresponding duration of time in which a first type of mobile terminal transmits an uplink Sound Reference Signal to the base station, and the first type of mobile terminal is a mobile terminal transmitting the uplink Sound Reference Signal to the base station in the special TTI; and
   transmitting, by the base station, a first control signal in a first duration of time in the special TTI to make a second type of mobile terminal judge that the base station transmits no downlink signal in the remaining duration of time in the special TTI, wherein the second type of mobile terminal is a mobile terminal transmitting no uplink Sound Reference Signal to the base station in the special TTI.

2. The method of claim 1, wherein the base station transmits the first control signal in a first period of time in the first duration of time, and
   the method further comprises:
   transmitting, by the base station, a second control signal in a second period of time in the first duration of time, wherein the second control signal is used for instructing the first type of mobile terminal to receive data; and
   transmitting, by the base station, data in a third period of time in the first duration of time.

3. The method of claim 2, further comprising:
   receiving, by the base station, the uplink Sounding Reference Signal transmitted from the first type of mobile terminal in a second duration of time in the special TTI.

4. The method of claim 3, wherein a guard period duration of time is reserved between the first duration of time and the second duration of time.

5. The method of claim 2, wherein the first control signal is ignored by the first type of mobile terminal.

6. The method of claim 1, wherein the base station transmits the first control signal in a first period of time in the first duration of time, and
   the method further comprises:
   transmitting, by the base station, a third control signal in a second period of time in the first duration of time, wherein the third control time is used for making the first type of mobile terminal to judge that the base station transmits no downlink signal in a third period of time in the first duration of time.

7. The method of claim 6, further comprising:
   receiving, by the base station, the uplink Sounding Reference Signal transmitted from the first type of mobile terminal in a second duration of time in the special TTI; wherein, a guard period duration of time is reserved between the first duration of time and the second duration of time.

8. The method of claim 6, wherein the first control signal is ignored by the first type of mobile terminal.

9. The method of claim 1, further comprising:
   receiving, by the base station, the uplink Sounding Reference Signal transmitted from the first type of mobile terminal in a second duration of time in the special TTI.

10. The method of claim 9, wherein a guard period duration of time is reserved between the first duration of time and the second duration of time.

11. The method of claim 1, wherein the first control signal is ignored by the first type of mobile terminal.

12. A base station, comprising:
- a determination unit configured to determine a special Transmission Time Interval, TTI, over a downlink carrier, wherein the special TTI comprises a corresponding duration of time in which a first type of mobile terminal transmits an uplink Sound Reference Signal to the base station, and the first type of mobile terminal is a mobile terminal transmitting the uplink Sound Reference Signal to the base station in the special TTI; and
- a signal transmission unit configured to transmit a first control signal in a first duration of time in the special TTI to make a second type of mobile terminal judge that the base station transmits no downlink signal in the remaining duration of time in the special TTI, wherein the second type of mobile terminal is a mobile terminal transmitting no uplink Sound Reference Signal to the base station in the special TTI.

13. The base station of claim 12, wherein the signal transmission unit is configured to transmit the first control signal in a first period of time in the first duration of time, to transmit a second control signal in a second period of time in the first duration of time to instruct the first type of mobile terminal to receive data, and to transmit data in a third period of time in the first duration of time.

14. The base station of claim 13, further comprising:
- a signal reception unit configured to receive the uplink Sounding Reference Signal transmitted from the first type of mobile terminal in a second duration of time in the special TTI.

15. The base station of claim 12, wherein the signal transmission unit is configured to transmit the first control signal in a first period of time in the first duration of time, and to transmit a third control signal in a second period of time in the first duration of time to instruct the first type of mobile terminal to judge that the base station transmits no downlink signal in a third period of time in the first duration of time.

16. The base station of claim 15, further comprising:
- a signal reception unit configured to receive the uplink Sounding Reference Signal transmitted from the first type of mobile terminal in a second duration of time in the special TTI.

17. The base station of any of claim 12, further comprising:
- a signal reception unit configured to receive the uplink Sounding Reference Signal transmitted from the first type of mobile terminal in a second duration of time in the special TTI.

18. A mobile communication system, comprising a base station, a first type of mobile terminal and a second type of mobile terminal, wherein:
- the base station is configured to determine a special Transmission Time Interval, TTI, over a downlink carrier, wherein the special TTI comprises a corresponding duration of time in which the first type of mobile terminal transmits an uplink Sound Reference Signal to the base station, to transmit a first control signal in a first duration of time in the special TTI, and to receive the uplink Sound Reference Signal transmitted from the first type of mobile terminal in a second duration of time in the special TTI;
- the first type of mobile terminal is configured to determine the special TTI, to ignore the first control signal, and to transmit the uplink Sound Reference Signal in the second duration of time in the special TTI; and
- the second type of mobile terminal is configured to judge from the first control signal that the base station transmits no downlink signal in the remaining duration of time in the special TTI.

19. The system of claim 18, wherein the base station is configured to transmit the first control signal in a first period of time in the first duration of time, to transmit a second control signal in a second period of time in the first duration of time, and to transmit data in a third period of time in the first duration of time; and
- the first type of mobile terminal is configured to receive the second control signal, and to receive the data transmitted from the base station according to the second control signal.

20. The system of claim 18, wherein the base station is configured to transmit the first control signal in a first period of time in the first duration of time, and to transmit a third control signal in a second period of time in the first duration of time; and
- the first type of mobile terminal is configured to receive the third control signal, and to judge from the third control signal that the base station transmits no downlink signal in a third period of time in the first duration of time.

* * * * *